(No Model.) 2 Sheets—Sheet 1.

J. MUSGROVE.
SEED SOWER.

No. 528,732. Patented Nov. 6, 1894.

Witnesses

Inventor
James Musgrove
By Attorneys (No Model.) 2 Sheets—Sheet 2.

J. MUSGROVE.
SEED SOWER.

No. 528,732. Patented Nov. 6, 1894.

Witnesses

Inventor
James Musgrove
By Attorneys

UNITED STATES PATENT OFFICE.

JAMES MUSGROVE, OF GREENVALE, VICTORIA.

SEED-SOWER.

SPECIFICATION forming part of Letters Patent No. 528,732, dated November 6, 1894.

Application filed September 14, 1893. Renewed September 7, 1894. Serial No. 522,401. (No model.) Patented in Victoria April 24, 1890, No. 7,663; in New South Wales June 1, 1892, No. 3,786, and in South Australia June 25, 1892, No. 3,110.

*To all whom it may concern:*

Be it known that I, JAMES MUSGROVE, a subject of the Queen of Great Britain and Ireland, residing at Greenvale, in the county of Bourke, in the Colony of Victoria, Australia, have invented certain new and useful Improvements in Seed-Sowers, for which I have obtained Letters Patent in Victoria, No. 7,663, dated April 24, 1890; in New South Wales, No. 3,786, dated June 1, 1892, and in South Australia, No. 3,110, dated June 25, 1892;) and I do hereby declare that the following is a full, clear, and exact description of the said invention, which will enable others skilled in the art to which it appertains to make and use the same.

My invention relates to that class of seed planting or sowing machines known in the art as "broad-cast" or those wherein the seed is thrown in every direction and adapted to fall upon the ground to be sown; and the principal purposes are to produce an arrangement which will more effectually distribute the seed, and one which will be attended by superior means for driving the operative parts.

All of these features, together with other features of construction and detail will now be described and the novel portions finally embodied in the claim.

Figure 6:
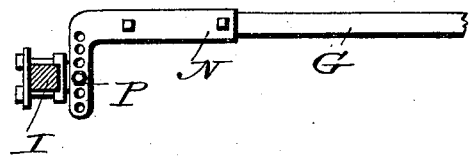
Figure 1:
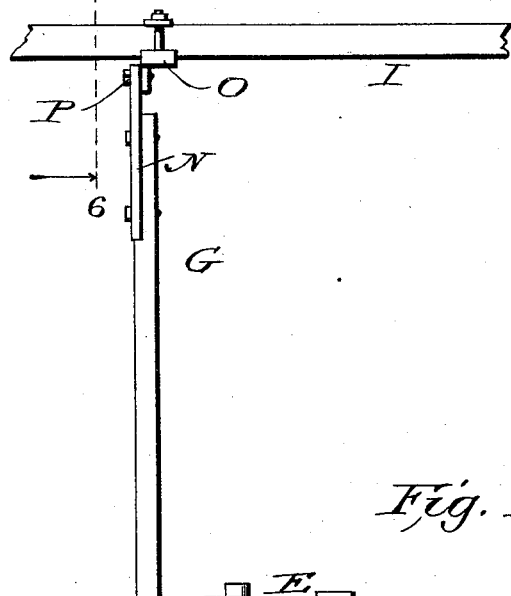
Figure 2:
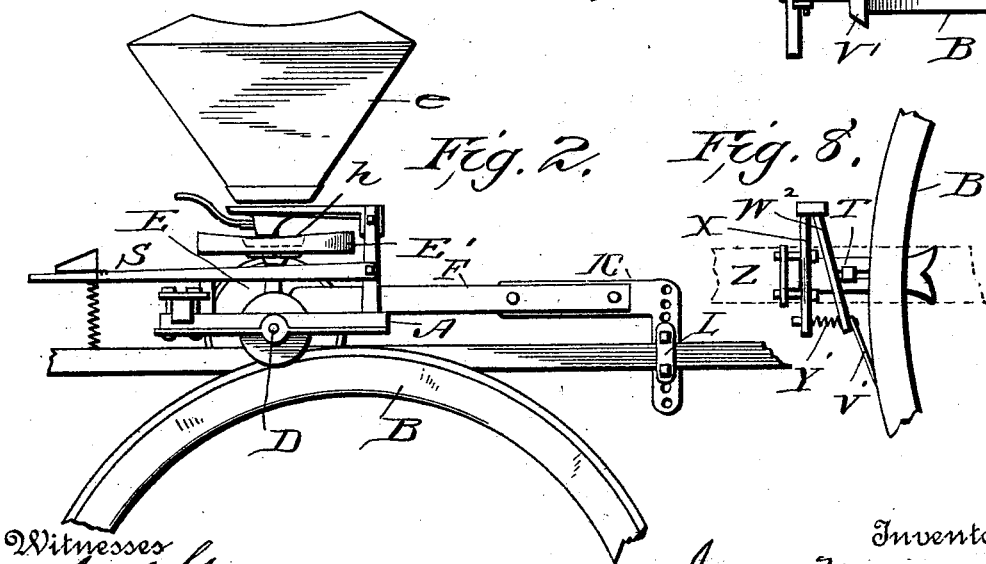
Figure 3:
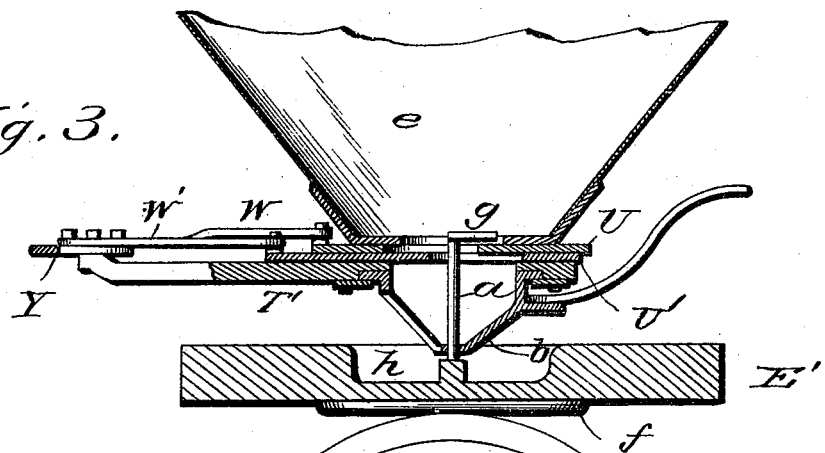
Figure 4:
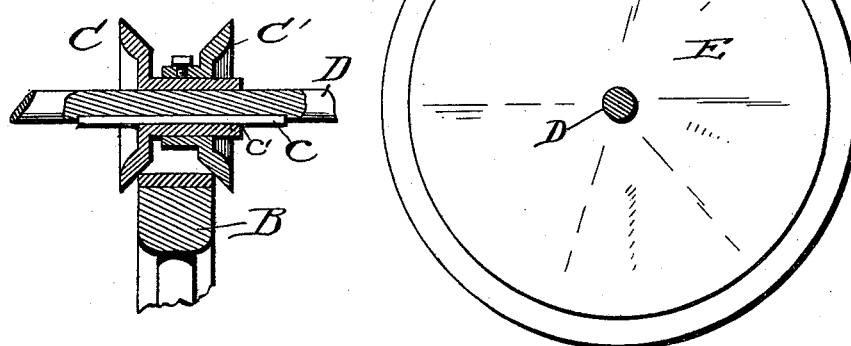
Figure 5:
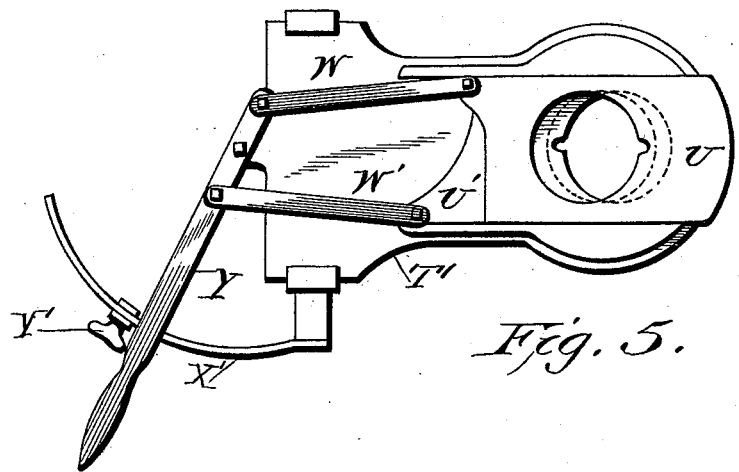

In the drawings: Figure 1 represents a plan view of my invention complete and in operative position; Fig. 2, a side elevation thereof; Fig. 3, a vertical cross-section; Fig. 4, a sectional detail of the friction pulley for transmitting power to the machine; Fig. 5, a plan view of the device for regulating the flow of seed; Fig. 6, a detail of the means of attaching the machine to the wagon, and Figs. 7 and 8 views in detail of the device provided for scraping the tire of the wheel.

The same letters apply to the same parts in each drawing.

The friction pulley may be made flat, but is preferably made with flanged beveled sides so as to bear on the edges of the tire B of the cart wheel as shown in Figs. 1, 2 and 4. In order that the pulley may fit tires of different widths it is made in two halves, the part C′ sliding upon the boss of the part C to which it is secured by means of the set screw as shown, the pulley itself being made to slide longitudinally upon its axis by means of the keyway $c'$, adapted to receive the key $c$, which key is rigid in the shaft or axis D. Thus it will be seen that the pulley C, is incapable of revolving independently of the shaft and that it may move longitudinally on the shaft irrespective of the movements of the latter. This pulley may be arranged to communicate motion to the machine in several ways but I prefer the method shown in Figs. 1, 2 and 3, in which the frame of the machine A rests upon the tire B of the cart wheel by means of the friction pulley C.

To the shaft D carrying the friction pulley C is fitted the bevel wheel E which by means of the friction pinion $f$ actuates the distributer plate E′.

The distributer plate E consists of a circular plate mounted upon the vertical spindle $a$, which is in turn journaled in the box $b$, and provided with the agitator $g$, whereby the seed in the hopper $e$ is made to drop on the plate or disk E′.

The machine is attached to and adjusted upon a farm cart by means of two rods F and G, hinged to the side rails H and I of the cart. The rod F is bolted to the machine as shown at J and at its front end is provided with a metal mounting K having a number of holes, and this mounting is secured and hinged upon the clamp L by means of the screw M, the clamp being bolted to the dray rail as shown. The rod G is similarly attached to the near rail of the dray by means of the mounting N which is hinged to the clamp O by means of the screw P. A side view of this mounting and clamp is given in Fig. 6. By means of the series of holes in the mountings the ends of the rods may be elevated or depressed in order to adjust the machine level upon the cart with wheels of varying height in relation to the sides of the cart. The position of the machine can be altered by sliding the clamps backward or forward upon the dray rails and in order to adjust the rod G to varying widths of carts, it is fitted to the tail of the machine in two seats Q and R in which it can be moved to any position and secured by means of the bolts and plates as shown.

The whole machine oscillating on the hinge screws M and P allows the friction pulley to follow the radial irregularities of the cart wheel. The irregularities in the plane of the wheel are provided for by the sliding motion of the pulley on its axis as aforesaid. In order to prevent jarring of the machine in cloggy land and also if necessary to increase the adhesion the light rail S is bolted to the machine and is provided with a spring which can be tied down to the framing of the cart at any desired tension.

Fig. 3 is a section, and Fig. 5, a plan of the feeding arrangement by which the flow of grain from the hopper to the distributer is regulated. The top plate T' carrying the hopper is provided with two cut off plates U and U', which are made to slide in opposite directions between the base of the hopper and the top plate by means of the lever Y and links W and W'. These plates are pierced with apertures preferably circular and when the lever is moved to the left the apertures become coincident and concentric with the center of the distributer. As the lever is moved to the right the apertures gradually close by the combined movement of the two plates and the center of the apertures thus formed at all stages is over the center of the distributer and consequently the agitator.

In free soils the flanges of the friction pulley by their shearing action keep the tire of the vehicle wheel clean but in sticky soils in wet weather the addition of a scraper is advantageous. This scraper is shown in Figs. 7 and 8, in which B is the tire of the vehicle wheel.

Figure 7:
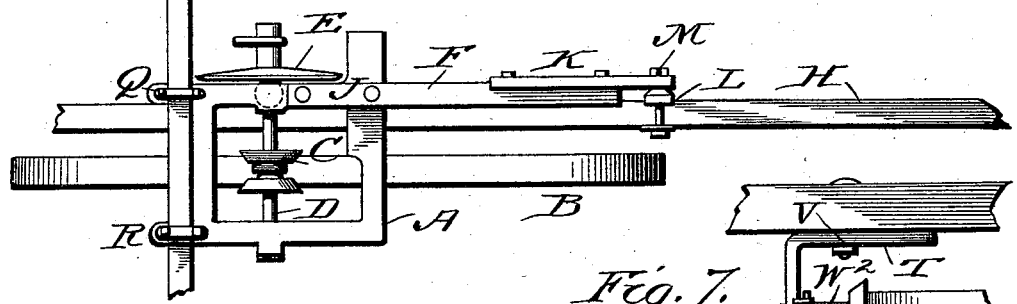
Figure 8:
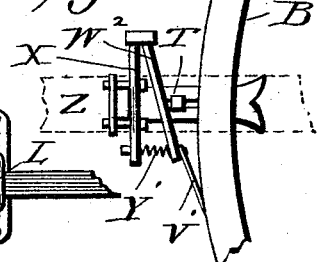

T is a plate $e$ of flat iron bolted at V to the shaft or side of the cart at right angles as shown in Fig. 7.

The scraper V' is a plate of steel which is riveted to the flat bar $W^2$ which is hinged at its upper end to the piece X and is pressed outward against the tire by means of the coiled spring Y' the range of motion being limited by a confining bolt. The scraper with its supports $W^2$ and X is attached to the plate T by means of a plate and two bolts as shown at Z, and by which it can be adjusted in position opposite the wheel of the vehicle so that as the wheel revolves the scraper will follow its irregularities, very slight tension on the spring being required. When the scraper is not required it can be turned out of the way by loosening the bolt V.

The agitator $g$ is always working in the center of the loose descending seed and consequently with least resistance.

To regulate the amount of grain sown, the quadrant X' over which the lever Y slides is provided with an adjustable stop Y' to limit the size of feed aperture as desired. The seed to be planted or sown is first placed in the hopper $e$, and the cut off plates U and U' adjusted so as to feed the desired amount. As the disk E revolves, the disk E', being in connection therewith, revolves also and the seed falls into the central depression $h$ of the disk E'. From thence it is thrown by the centrifugal influence attending the revolution of the disk.

Having thus described my invention, what I claim as new, and desire to secure by Letters Patent, is—

In a seed sowing machine adapted to be carried by a vehicle, the combination of a body portion in which the operative parts are arranged, a friction pulley driven by contact with one of the vehicle wheels and in connection with the operative parts of the machine whereby they are operated, and two arms rigidly secured to the body and extending at right angles to each other, one across the body of the vehicle to the opposite rail and the other parallel with the rail on which side the machine is, and having at their ends hinges whereby they may be pivotally secured to their respective rails and whereby the machine is made capable of a limited vertical movement on such hinges and the friction pulley held in contact with the wheel by which it is driven, substantially as described.

In witness whereof I have hereunto set my hand in presence of two witnesses.

JAMES MUSGROVE.

Witnesses:
  G. G. TWIN,
    *Patent Solicitor, Melbourne.*
  E. NICHOLLS,
    *Clerk to G. G. Twin, of Melbourne.*